May 2, 1967  N. B. DISMUKES  3,316,873
MULTIHULL VESSELS

Filed April 8, 1965  6 Sheets-Sheet 2

INVENTOR
NEWTON B. DISMUKES
BY
Curtis, Morris + Safford
ATTORNEYS

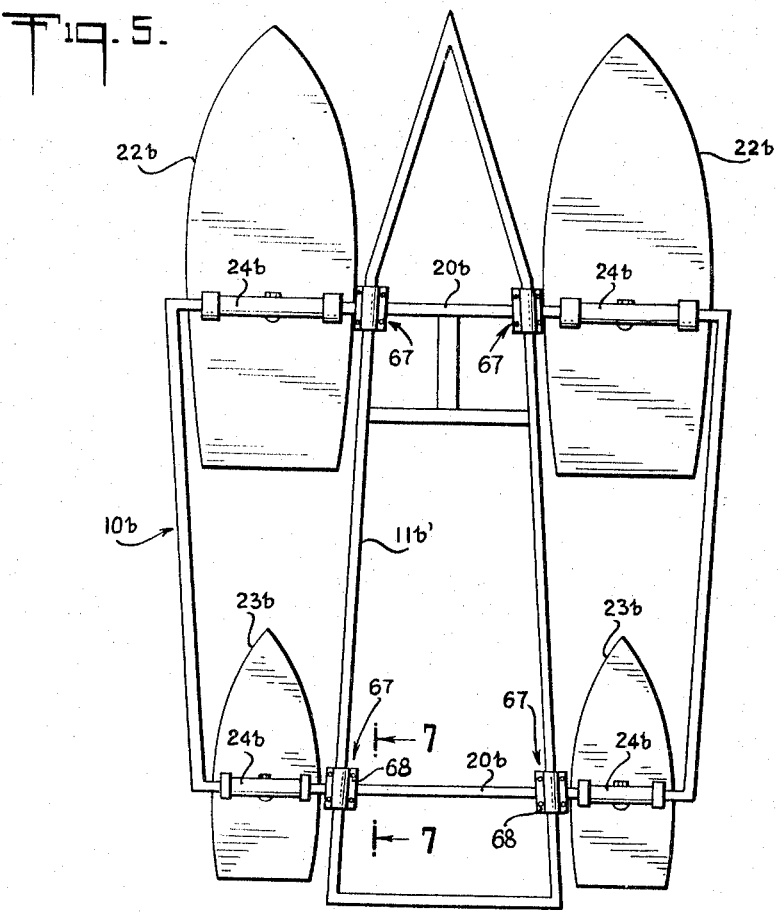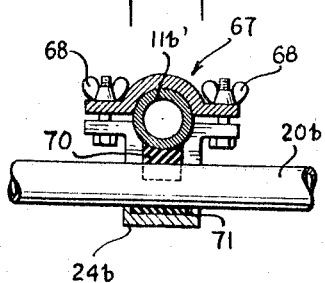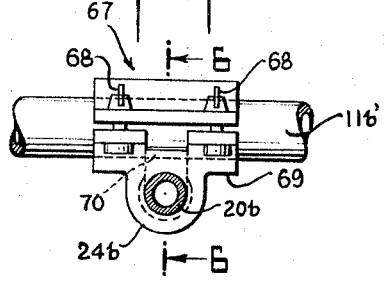

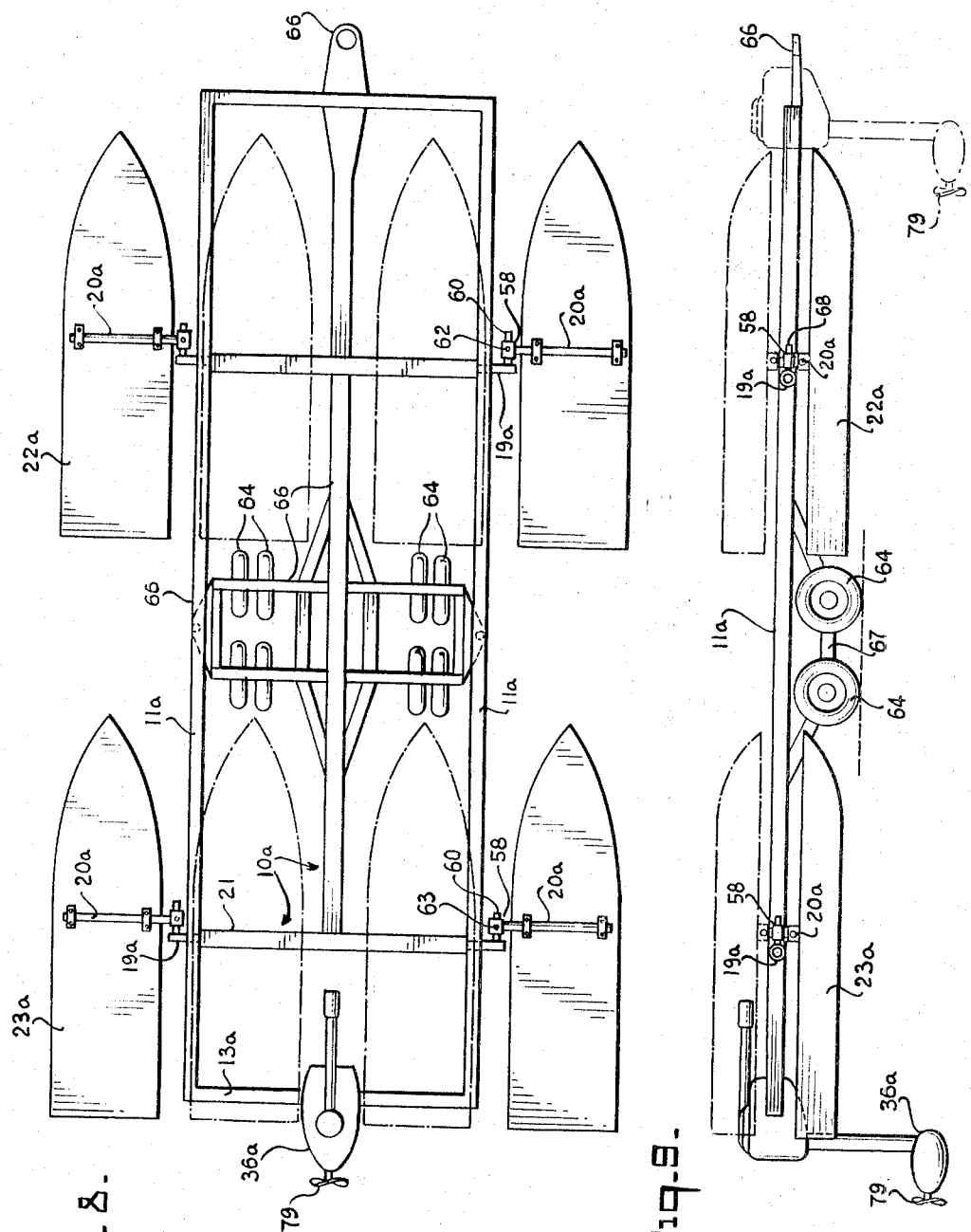

May 2, 1967 N. B. DISMUKES 3,316,873
MULTIHULL VESSELS
Filed April 8, 1965 6 Sheets-Sheet 5
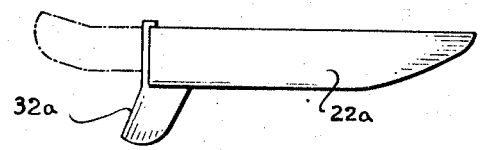
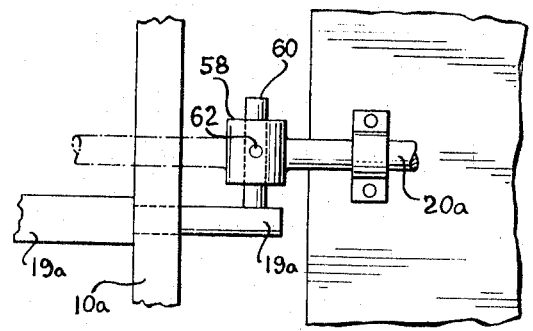
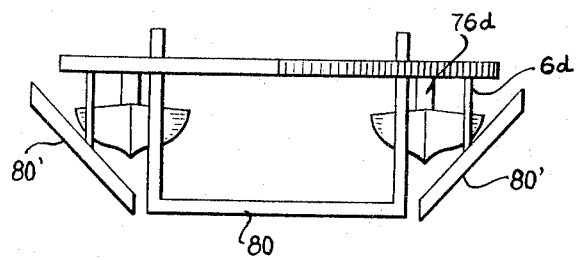
INVENTOR.
NEWTON B. DISMUKES
BY
Curtis, Morris & Safford
ATTORNEYS May 2, 1967 N. B. DISMUKES 3,316,873
MULTIHULL VESSELS Filed April 8, 1965 6 Sheets-Sheet 6

INVENTOR.
NEWTON B. DISMUKES
BY
Curtis, Morris + Safford
ATTORNEYS

United States Patent Office 3,316,873
Patented May 2, 1967

3,316,873
MULTIHULL VESSELS
Newton B. Dismukes, 159 Woodridge Circle
New Canaan, Conn. 06840
Filed Apr. 8, 1965, Ser. No. 446,635
11 Claims. (Cl. 114—61)

This application is a continuation-in-part of Ser. No. 225,766, filed Sept. 24, 1962, now abandoned.

This invention relates to improved multiple hull vessels and more particularly to vessels having at least three hulls articulated into a single vessel.

Numerous efforts have been made in the past to produce light displacement vessels having stability and other seaworthy characteristics. The idea of multiple hulls has been particularly attractive in sailing vessels in which the laterally spaced hulls give greater resistance to "heeling" and especially to knock-down by sudden gusts of wind in a rolling sea.

Of recent years twin hull vessels, both sailing vessels and power boats, so called "catamarans," have achieved much success. It has also been proposed to build three hull vessels called "trimarans" with a central hull between two side hulls, but such vessels have not achieved significant success. In general, multiple hull vessels such as catamarans have been produced with long narrow displacement type hulls with widest spacing between them compatible with maneuverability.

In spite of the practical advantages which the catamaran gains over the single hull, a number of problems have arisen. For example, in sailing vessels, and to a lesser although still significant extent in vessels driven by power, one of the multiple hulls may be driven into the sea, "tripping" the hull so that its bow is turned down and its stern thrown up; or, even without "tripping," the effect may be, at best, to cause transitory increases in hull resistance. Too great an angle of heel will drive the lee hull down into the water or may lift the weather hull out of the water, increasing resistance and reducing speed. Also, if the weather hull is lifted much above the level of the sea, a condition can be reached in which stability rapidly ceases and capsizing may occur, which is more serious than with a monohull vessel because the multi-hull vessel does not have adequate righting moment to recover after knockdown.

According to the present invention, I provide a plurality of relatively short hulls pivoted to a common deck or frame at or close to their respective centers of buoyancy, both when floating at rest ("static" or "displacement" buoyancy) and when driven ("dynamic" buoyancy, i.e., with the hydro-dynamic forces added to the static forces of displacement buoyancy). The hulls are symmetrically arranged with respect to the longitudinal axis of the vessel, at least three of said centers being at the apices of a polygon.

The polygon advantageously is an isosceles trapezoid or rectangle with the pivotal connections between the deck or superstructure and four hulls respectively at its corners. Other polygonal arrangements may be used having symmetry with respect to the longitudinal axis of the vessel as a whole, and with the hulls, respectively, substantially spaced on each side of the axis and fore and aft of the center. This gives greater stability in the sea than two or three hulls. Such construction permits a relatively large deck with great stability both fore-and-aft and athwartship, the latter being of particular importance in sailing vessels.

In the four hulled embodiment of this invention, stability, comfort, maneuverability and sail carrying capacity are achieved when the centers of buoyancy of the four hulls are located at the corners of a rectangle of greater length than breadth (advantageously less than 1.5 times the breadth, but even up to twice).

Each hull is attached to the deck through a bearing which permits the hull to pivot around a pitch axis but does not permit it to roll or yaw relative to the other hulls. This results in the hulls automatically adjusting themselves to the contour of the waves so that when the boat is driven in a heavy sea, instead of the bows of the multiple hulls alternately plunging into the waves, the hulls ride up and down on the wave surfaces, adjusting their fore-and-aft inclination (trim) to the wave surface, thus minimizing resistance to forward progress.

The weight distribution of the hulls, relative to the axes of their pivots, is advantageously such that the hulls, when supported free of the water, should assume an angular position at least, and advantageously about, 20°, between the water line of the hull and the horizontal. Alternatively, if the hull is mounted on torque rods or other resiliently yieldable connection devices to control its position about its bearing axes, the torque exerted may be designed and adjusted to bring the hull to this angular position when it is free of the water and suspended on said bearings and to bring the hulls to design trim when on the water and supporting the deck or other load-bearing structure. When hydrofoils are used, as hereinafter set forth, they may likewise hold the hulls free of the water, whereupon the advantage of the angular positioning will come into play.

The vessel of my invention has surprisingly low resistance in a rough sea, the boat is drier, and there is far less shock from wave action because the waves do not strike rigidly held hulls, but each hull, being relatively small, less massive and pivoted, yields readily, quickly tilting to the slope of each wave. This permits the hull, deck and other construction to be made lighter as they do not have to resist the shock stresses of a bow "tripping" in a wave. The resulting saving in weight facilitates the planing of the vessels, improves their sailing characteristics, minimizes wetted surfaces and leaves greater capacity for carrying passengers, crew, cargo and fuel and makes possible greater speed of the vessel.

The journaling of the hulls should be substantially without play, on their pitch axes, i.e., on axes normal to the fore and aft axis of the vessel. Advantageously, I introduce shock absorber means, for example, the hulls may be connected to the deck structure through a torsion bar spring which exerts but little resistance to small motions but increases it rapidly as the rotation of the hull about the axis becomes greater; or hinged hulls may be damped by spring and lever devices or by other types of mechanical or friction or fluid shocks absorbers. Such devices may also assist to bring the desired centers of buoyancy and center of flotation to a desired location, by pushing down the bow or stern and thus changing their relation. It should be understood that the "center of buoyancy," referred to herein is the "dynamic center," taking into account forces which result from the motion of the boat through the water, including its planing when it has reached sufficient speed to make this possible. The dynamic centers of buoyancy should not be expected to coincide with the static centers of buoyancy, and it is the former which is of importance in the present invention.

As pointed out by Lindsay Lord in his "Naval Architecture of Planing Hulls" (Cornell Maritime Press, 3rd Ed., pages 100–102), the action of planing introduces an additional load in the form of "negative pressure" under the hull, and the dynamic upward thrust of inertial pressure of the water, when planing, ordinarily adds to the upward component of buoyancy, and these usually shift aft the combined component of force.

The "center of flotation" under planing conditions will approximate the center of dynamic pressure, but in small boats of the planing type the center of flotation under static conditions is noticeably further aft than the center of buoyancy. The "center of flotation" as used in the above is the effective fulcrum about which changes of static trim take place when weights are added, removed, or shifted. It should be clearly understood that the center of flotation is not the center of buoyancy, although in certain designs they may sometimes occur at the same position.

The static center of buoyancy is the theoretical point of application of the upward resultant forces of displacement buoyancy, just as the center of gravity is the theoretical point of application of downward resultant of forces of gravity. It may also be stated as the center of gravity of the water displaced by the hull.

The dynamic center of buoyancy, or as it is sometimes called the "dynamic center of pressure," is likewise the theoretical center of the forces resulting from pressure of water on the hull, but includes the inertial forces due to movement of the hull through the water, as well as the mere hydrostatic forces. These inertial forces are not always, like the forces of static buoyancy, in an upward direction. Just as the lift on an airplane wing is largely due to suction created by inertia of the air deflected away from the wing, so the inertial forces of the water may produce a suction on the after part of the hull, which in speedboats often causes the hulls to "squat" and throw its bow high into the air.

In older types of vessels the center of flotation was considered an important design characteristic. My present invention avoids shifting of hull loading by having all of the weight of the vessel applied to the hulls at their axes of pivotal attachment to the vessel. This pivotal axis is ordinarily in fixed relation to the hull, although it can be made adjustable for use under different conditions.

According to the present invention the center of gravity of the hulls will best be slightly aft of the pivot axis so that if one hull is left temporarily free of the water by wave action, or is temporarily held up by hydrofoils, so that it hangs on its pivot, its center of gravity will swing down under the pivot axis, which will bring the bow up to a position in which the normal water line of the hull is at an angle about 20° to the horizontal; so that when the vessel strikes the next wave, or comes down on the water again, it will quickly adjust to the surface of the water without immersing its bow or "tripping."

The vessel should have sufficient beam for stability. When four or more hulls are used, this generally results in the lateral separation of the centers of buoyancy of port and starboard hulls respectively, by more than one-half the lengthwise separation of the center of hulls on the same side. Slight displacements of the centers of buoyancy from their best exact location do not introduce serious degradation of vessel performance. However, greater departures from the location of these centers of buoyancy will result in a loss or the impairment of desirable characteristics of the present invention.

The relatively small hulls of the present invention make it feasible to use solid flotation hulls, e.g., of foamed plastic such as polystyrene foam or foamed polyurethane or even balsa wood or sponge rubber and the like, all of which have the advantage that they can be submerged without loss of buoyancy and even if punctured, they cannot be swamped. Thus an extremely safe vessel can be built which can safely be engulfed by a wave or even torn by a rock or other obstruction which would sink or swamp an ordinary vessel. While this is an advantage of the present invention, it should be understood that the invention is not limited thereto, and where these peculiar advantages are not required, it may be desirable to use hollow hulls to provide space for stowage or for other purposes.

It is desirable for maximum seaworthiness that the deck be sufficiently above sea level to avoid taking solid water from the waves. The freedom of the several hulls to adjust to the waves, which the present invention affords, serves to hold the deck steady and above the waves. I have found that the deck should best be above the water line by only a little more than one-seventh of the sum of the greatest distances of the centers of buoyancy on opposite sides from the fore-and-aft axis of the vessel. This height is less than would be safe with prior catamarans. A moderate increase in height of the deck above this one-seventh provides a margin against encountering the crest of waves.

The deck in a vessel of the present invention can be very wide in comparison to its length, which simplifies design giving maximum room with minimum hull displacement. If too long a deck is used, the overhang at the bow or the stern could strike the crest of a wave when one of the hulls is riding in a trough. It is advisable to avoid such excessive lengths although the bow portion of the deck or superstructure can extend forward or aft in the form of a grating or open framework or other structure which will permit "solid" water to pass through.

Steering is preferably by means of a rudder or rudders at the rear of the vessel, advantageously behind the end or ends of the aftermost hull or hulls. It is, of course, possible to incorporate steering rudders either on the stern of a centered hull or on laterally-spaced hulls or in all. However, a rudder mounted on the rear of the deck not only has the advantage of maximum leverage, but can also operate in water undisturbed by passage around a hull. This also avoids differences in turn radii which has caused trouble with ordinary catamarans, particularly those with two hulls widely spaced laterally.

If the vessel is to be driven by sail, the location of the masts can be conventional. In a single masted sailing vessel with polygonally arranged multiple hulls according to the present invention, the mast should, in general, be stepped a little aft of a line connecting centers of buoyancy of the two forward hulls. Vessels of the present invention are very stable and therefore mast location is not as critical as with some other hull designs. This is an advantage, for while the mast should initially be located for maximum efficiency, changes in sail area which may be necessary to operate in heavy weather will not upset the efficiency of the vessel. This ability to sail effectively under varying sail combinations is an advantage of the present invention.

Sidewise movement, i.e., "leeway," of sailing vessels is usually reduced by keels or centerboards. In a catamaran, for example, a board such as a centerboard or a daggerboard may be located between the two hulls, beneath each hull, or alongside the hulls. It is recognized that a board underneath a hull is more efficient than elsewhere. It is advantageous to have a board which will flip up when it strikes bottom or a submerged rock. In my invention these advantages of efficiency and safety can be achieved by locating the boards at and beneath the sterns of the hulls, with the boards pivoted to swing upward and away from the stern, but locked with a shear pin, or more advantageously urged by a spring, adapted to yield before damage to the centerboard or its mounting. Rudders may be designed and located to aid such leeway control, and may likewise be made to swing up in this same way.

If highway transport or mooring restrictions limit total beam, the hulls which extend beyond the deck of my multihull vessels may, when not in service, be retracted beneath the deck by means of a slidable connection between the journal and the deck, or they can be hinged so that one or more of the hulls fold inward.

When the vessels are to be power driven, either as an auxiliary sailing vessel or as a power vessel, the power plants may be in one or more of the hulls; advantageously in hulls which are laterally spaced, the power may be applied also, or instead, from the deck structure, or from nacelles under the deck, advantageously with angled propeller drives, such as are common in outboard motors.

These nacelles need not be in the water and thus need not cause serious drag. This arrangement has a further advantage in that the propeller drive and the nacelles, if they are not already above the water level, can easily be raised so as to be completely out of the water when the vessel is operated under sail alone.

In a four-hull vessel, e.g., for a houseboat where maneuverability may be a problem, at least one motor may be mounted near the bow or between the two forward hulls and another motor or motors near the stern. Both may be secured to the deck by vertical pivots, e.g., a pintle arrangement, such that they may be turned in either direction at least 90 degrees from the dead ahead position; or the propeller and drive gear may be so turned around a vertical shaft. To moor alongside a dock, for example, both fore and aft propellers may be directed toward one side so as to impart a sidewise movement to the vessel; and, for turning in close quarters, a forward propeller may be turned to one side and an after propeller toward the other side. This gives independent control of the turning arcs of the respective ends of the vessel, so that they may follow the same arc in the same direction, for slower turns, or in opposite directions for a stationary spin, or different arcs, for tight turns. Even in sailing vessels, such steering at spaced points—spaced fore and aft—by powered dirigible propellers or by spaced rudders, may also be used with advantage.

Broadly, therefore, it may be said that the present invention is not limited to any particular location of power although the particular arrangements mentioned herein are believed to present both novelty and invention.

The arrangements shown, and described above, are much superior to a large hull merely provided with outriggers. There are advantages especially in having the hulls all relatively short but substantial in size, and nearly equal in displacement, with the forward hulls a little larger than the after hulls. The journals on the hulls of the present invention actually provide for each of the hulls to continually adjust its position so as to support its share of the weight regardless of the particular point of the wave on which each hull may be located. This is not possible in a design where there are outriggers and a main hull, which ride at varying positions on the waves. In such cases, the roll of the main hull will tend alternately to submerge and to lift out of the water the outrigger hulls; whereas, in ordinary monohull vessels and in the multihull vessels such as catamarans which have been known before, the wave action causes pitch and roll and strains the connections between multiple hulls.

The several short hulls in tandem reduce stiffness materially and reduce the speed/length ratio. This is especially important with sea sled type hulls, and when speed is above about six knots.

The hulls used for my invention advantageously are buoyant when wholly submerged, i.e., "unsinkable floats," with volumetric freeboard predetermined, relative to the weight to be carried, so that the maximum total displacement buoyancy of each is only a little in excess of its normal displacement (total buoyant volume less normal displacement volume is the "volumetric freeboard"). Thus, each hull carries its predetermined share of the total displacement load plus or minus a predetermined variation to accommodate wave action. Because the static buoyancy of each is thus limited, waves may wash over any one, when its limit has been reached, and thus retain the buoyancy of all, rather than lifting one or more out of the water. This reduces the pitch and roll transmitted to the deck.

In some waters, where wave length and frequency are reasonably constant, the pitching of the deck may be minimized if the supporting hulls are spaced apart so that the lengthwise distance between the dynamic centers of buoyancy of the hulls is somewhat greater than the distance between wave crest and wave trough, preferably 1.5 to 2.5 times this distance. To this end the mounting of the hulls on the superstructure can be adjustable so as to adjust their spacing to the wave dimensions.

In the accompanying drawings and in the specification I have shown diagrammatically a number of examples of my invention and suggested certain modifications thereof. These have been selected and presented with a view to instructing others in the principles of the invention and the results attainable so that the invention may find many applications and so that others skilled in the art may adapt and modify the invention according to the requirements of each particular use.

In these drawings:

FIG. 4 is a transverse sectional view taken on line 4—4 of FIG. 2.

FIG. 5 is a plan view of another four-hulled vessel, using, however, broad planing hulls instead of the sled hulls of FIGS. 1–4.

FIGS. 6 and 7 are detailed fragmentary sectional views showing connections used on FIG. 5, respectively on line 6—6 of FIG. 7 and 7—7 of FIG. 5.

Figure 1:
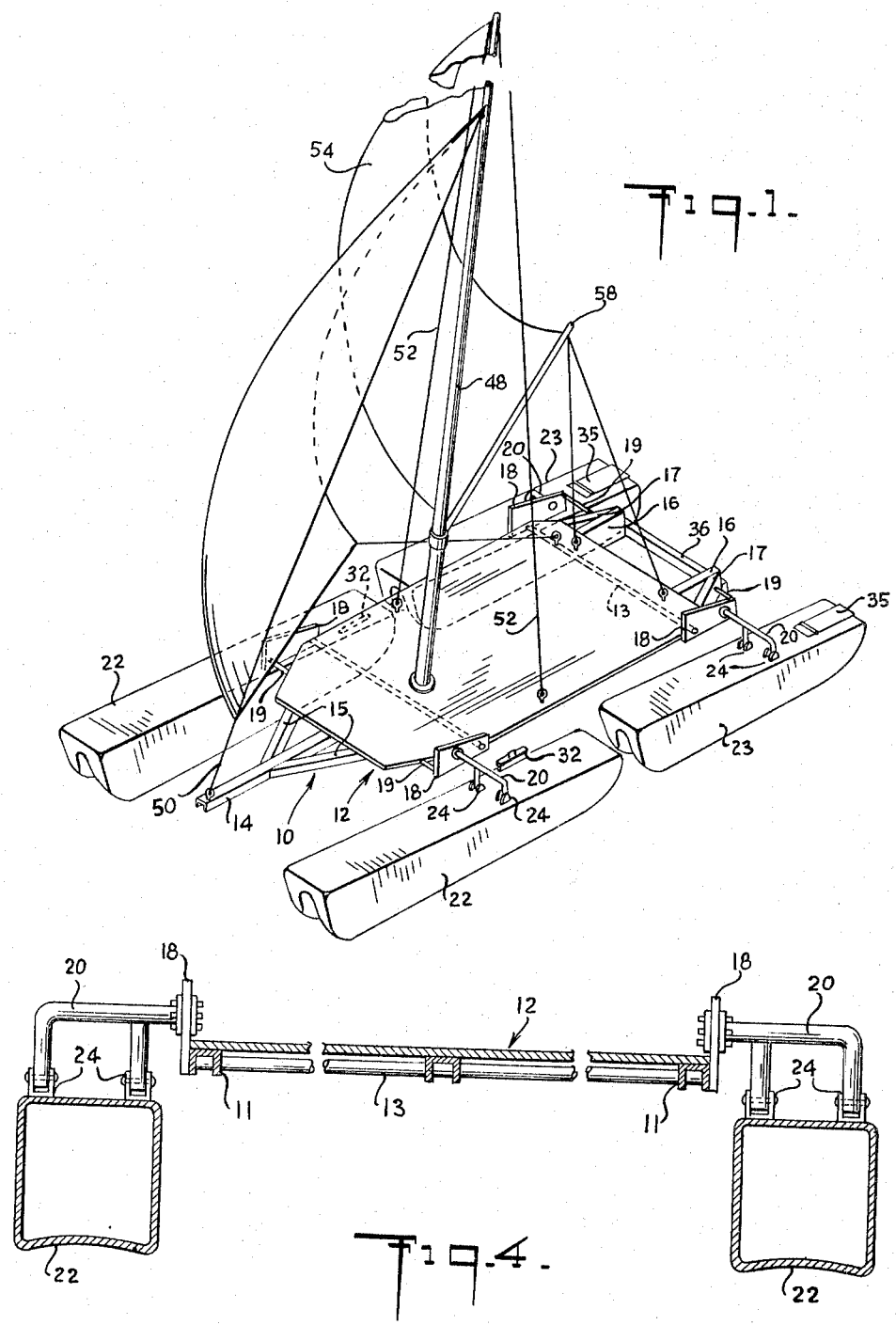
FIG. 1 is a view of a four-hull vessel taken from above the port bow.

FIGS. 8 and 9 show another embodiment of the invention which is particularly designed for trailering on the highway, the hulls being mounted parallel to the outside of the deck structure as in FIG. 1 when in the water, but being adapted to fold over the deck to reduce the overall width for moving along the highway.

FIG. 10 is an enlarged detail plan view of a swing mount for alternative use to retract the hulls, as in FIG. 8. The retracted position of the swing arm is shown in dot dash lines.

FIG. 11 is a view in elevation of a hull adapted for use with the present invention, showing in broken lines how the leeboard is mounted at the stern and adapted to swing up to a more or less horizontal position in case it encounters a shallow bottom or an obstruction under the hull.

Figure 12:
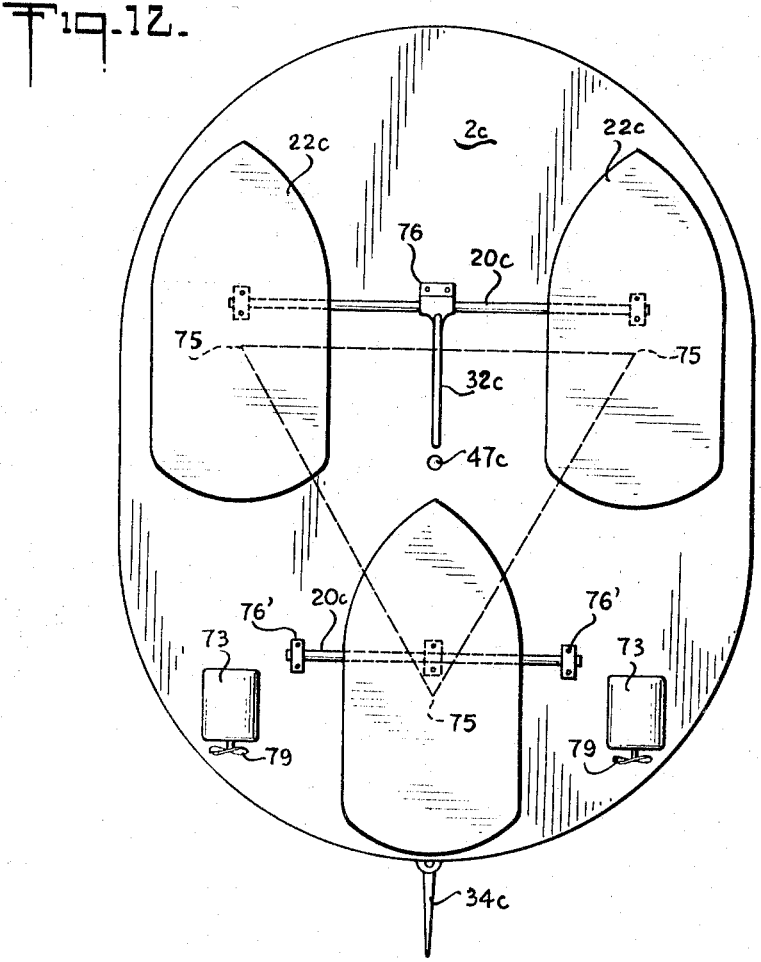
Figure 13:
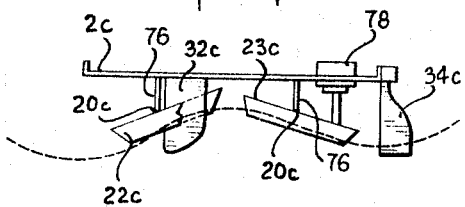
Figure 14:
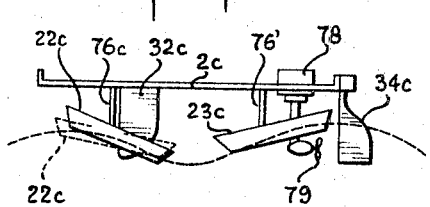

FIGS. 12, 13 and 14 represent another example of the invention using three hulls arranged on an equilateral triangle, FIG. 12 being a plan view, FIGS. 13 and 14 side elevation views showing diagrammatically the arrangement of parts and the action on waves.

FIG. 15 is a front view of the vessel according to my invention, which in addition to the planing pivoted hulls, has a number of hydrofoils which cooperate to lift the weight of the vessel and minimize the drag in the water.

Figure 2:
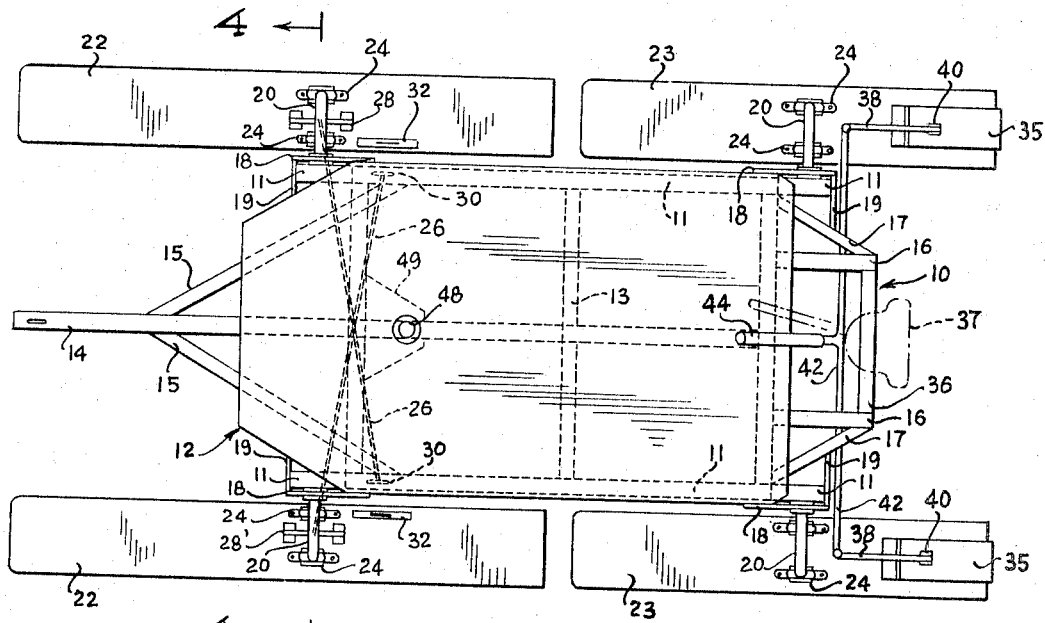
FIG. 2 is a top plan view of the frame and hulls with the deck and rigging removed.

In FIGURES 1 to 4, I have shown a preferred example for use as a day sailer for racing and pleasure boating. This vessel is built with a frame 10 of aluminum welded channels and tubes as shown in FIGURE 2 and with a deck plate or floor 12 secured thereto to make a rigid deck structure. Side members 11, cross members 13, a bowsprit 14, being the forward extension of a longitudinal frame member, bracing struts 15 therefor, and at the after end a pair of sternsprits 16, also provide with bracing struts 17, are all welded together into the framework 10 of the vessel.

At each corner are mounting plates 18 made rigidly integral with the frame 10. These are braced for added rigidity by mounting plates 19 secured between the respective plates and struts 15 and 17, respectively. Each of these plates 18 has bolted or riveted etc., thereon a cantilever shaft 20 for pivotally mounting the hulls 22, 23, between the static center of buoyancy and the center of flotation. Each hull is pivotally secured to one of these cantilever shafts by pillow bearings 24, near opposite sides of each hull to hold the angular relation of each hull to its shaft 20. These bearings allow the hulls to pivot freely about a transverse axis for pitching, but secure them against roll, about a longitudinal axis and against yawing relative to the deck.

Each hull is also held resiliently with provision for pitching movements by a torsion bar torque rod 26. In the example shown, these are ¾" torque tubing with the T-ends 28, 28' welded on. Each torque rod has its T-end secured to the deck of its hull, e.g., by bolts, as shown, through clamping saddles 30. These torque rods extend across the deck frame 10 to give sufficient length for the desired resiliency and are secured at the far end against turning. (To avoid confusion of lines, these torque rods are shown only on FIG. 2 and only on the fore hulls, but it will be understood that they will usually be on all hulls.)

The hulls shown in this example are sea sleds, i.e., planing type hulls with bottoms concave, or inverted V, in cross section (cf. Patent 1,204,355), and are of buoyant material, or hollow, with sealed exterior, so as to be proof against swamping. The form of the hulls is dictated by standard design principles for "planing" at sailing velocities.

Dagger boards 32 are provided on the forward hulls 22 to control leeway; and on the after hulls 23 the rudders 34 also serve this purpose. These are representative of the various types of leeboards, or vertical planes, which can be used, as well understood. The daggerboards, as will be seen from the drawings, are located in the area between the mast and the hull pivots 20 to give the best maneuverability.

Figure 3:
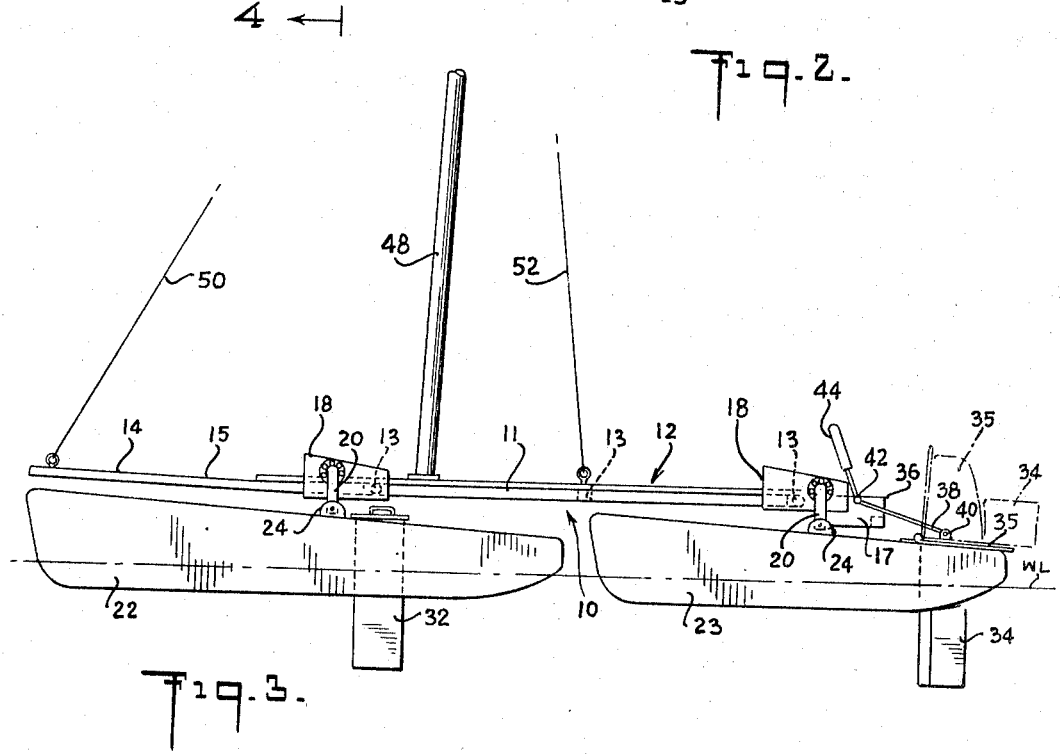
FIG. 3 is a side elevation showing the port side of the vessel afloat on the water.

The rudders 34 are mounted on hinged boxes 35 inset into the after end of the hulls 23 and hinged so they can be swung up out of the water for greater speed or maneuverability (see FIG. 3). Both rudders will ordinarily be up when operating under outboard motor, as the motor itself gives sufficient steerability. When reaching or tacking down wind, one rudder may be down and the other up; and in very shallow water both rudders may be swung up; but in general for sailing both rudders will be in the water.

A wooden frame member 36, e.g., 1¾" x 3" oak, is bolted to the sternsprits 11 to hold one or more outboard motors 37. Outboard motor or motors may also be mounted between the bows of hulls 22 on a cross frame member attached to braces 15, with advantages set forth above.

The rudder linkage shown consists of tiller bars 38 each hinged to the top of the rudder post 40, which is mounted on bearings at the top and bottom of the box 35 so that the rudder post is safely cantilevered below the box. The tiller bar is pivotally connected to a transverse tie bar 42, which connects the tiller hand lever 44 to the two tiller bars on the two hulls. In some cases a more sophisticated gear may be used to turn the rudder on the inside of a turn more abruptly than the one on the outside, but that is not necessary here.

A deck 12, in this instance ⅜" marine plywood approximately fitted to the top of frame 10, is secured on said frame, and a mast 48 is stepped thereon and secured to the center main frame member. Advantageously, a reinforcing plate 49 is welded to the fore transverse member of the deck frame and to this center frame member to help support the mast.

The standing and running rigging may be according to accepted practice for such sailing vessels. As shown, the mast is stayed by a forestay 50 and shrouds 52 secured to the deck frame a little abaft the mast. Permanent or removable back stay or quarter stays may be provided, as with other sailboats to hold the mast and transmit the forward thrust.

A roller reef boom is shown at 53, and a sail 54 is bent onto the mast and the boom in the usual way and the boom is secured to the mast in the usual way by a gooseneck fitting and a downhaul connected to the tack of the sail.

A particular embodiment which I have used successfully is 22 feet over-all length and 10'1" over-all width. The bows of the fore hulls and the tip of the bowsprit are aligned. The hulls 22 are 12' long with their pivots 7' back from their bows. The bows of the after hulls 23 are 7" back from the sterns of the fore hulls. These after hulls are 113" length over-all, and the pivots on the after hulls are 5'5" back from their bows. Each of these hulls is 20" wide and 17" deep. The bows of each forward hull is 10" above the level-water line, and of the after hulls 7½". The concavity of the bottoms in the axial plane through bearings 24 is 5". The mast is stepped 9' back from the foot of the forestay and is 30'10" high. The hulls are spaced 3" from the deck at each side, and the distance between centers of buoyancy of opposite hulls is 101". The deck width is 75" and its length about 130". The concavity in the bottoms of the hulls is greatest at their bows and diminishes gradually toward the stern. In the example shown, the depth of the concavity at the bow is about 15"; under the bearings 24 it is about 3"; and at the stern it is about ½". In other cases the concavity may be flattened out at, or even forward of, the stern. These dimensions are given as an example of good design to aid others in using the invention and adapting it to the conditions of a particular use, but will be varied as conditions of such use vary.

These hulls are designed so that with additional loading the center of static buoyancy and the center of flotation do not shift, i.e., the increase in displacement, as the hull is pushed deeper, is substantially balanced on opposite sides of the pivot. Thus, the desirable relation of having a pivot between these centers can be retained despite changes in the deck load. The dynamic center of buoyancy does, of course, shift, and the hulls will vary their trim accordingly, with differences in speed and wave action. However, with the pivots at or below the water level, the resistance of the hull is minimized. For least resistance I prefer to have the axis of the bearing about half way between the water line and the bottom of the hull.

A significant feature of my invention used in this embodiment is the arrangement of sea sled hulls in tandem and external to the area of the deck or "house" so that they are free to pitch to follow the wave action without pounding any other part of the vessel. Experiment has shown that sea sled type hulls have lower resistance in the water than hard chine planing hulls for the same speed and displacement (see John Teale's "Fast Boats," St. Martin's Press, New York, 1961, pp. 27, 43–47), but although the lift of the sea sled is comparable to that of a multi-step hydroplane, the action of the sea sled is far too stiff in the case of large sleds (cf. Lindsay Lord, "Naval Architecture of Planing Hulls," 3d edition, pp. 98–99). I have found that with a number of shorter sea sled hulls in tandem, mounted so that one trails as closely, and in line with, another as feasible, and pivoted at points between the static centers of buoyancy and the centers of flotation, stiffness can be reduced to a minimum and changing or shifting a deck load does not seriously affect the action of the hull in the water.

FIGURES 8 and 9 illustrate another mounting arrangement for the several hulls. In this case the vessel is intended for over-the-road transport by trailer and day sailing in confined waters. Since the width permissible on the road may be less than the optimum width for the vessel when in the water, the axle 20a is hinged to the cross bar 21a secured to the deck frame 10a so that the hulls can be folded inboard within the width of the deck, as shown by the broken lines on FIGURES 8 and 9.

The main frame 10a as shown comprises longitudinal side members 11a, on which are secured the transverse frame members and the cross bars 21, with a bearing 58 adapted to rotate on a stubshaft 60 projecting from one side of bars 21 when unlocked and to be locked or clamped thereto, e.g., by the pins 62 for fair weather sailing and clamped to cross beams for rougher water. The bearings 58, as shown in FIGURE 9, extend downward when in position for launching and upward when swung back to the trailering position.

FIGURES 8 and 9 show the vessel on a trailer having wheels 64 and a frame 66 which may be removably bolted to deck frame 10, as shown, or may be separate, with the vessel carried on it when trailering and floated off when put in the water. The two outboard motors are shown in the positions they would be used in the water, although they would not ordinarily be left in that position during trailering. The positions of the hulls when folded back are shown in broken lines and the position for sailing in full lines. Instead of folding hinged hulls, they may be mounted on a slide or telescoped mounting so that they slide in under the deck, without capsizing over the deck.

FIGURES 5 and 12 show more conventional types of planing hulls used in my invention.

In FIGURE 5, four hulls, 22b and 23b, are shown attached to deck frame 10b by journal bearings 24b and, if desired, suitable damping devices, like the shock absorbers used on land vehicles. The frame is made of a sufficiently resiliently yieldable fatigue resistant material to accommodate twisting due to wave action, e.g., when the diagonally opposite hulls may be lifted and the others in a trough. Fiberglass reinforced plastic can be used for this, or stainless steel.

The clamps 67 shown in FIGURES 5, 6 and 7 are adapted to accommodate such springing of the frame but with a friction resistance. To this end, the clamping force is adjustable, e.g., by friction lock nuts 68, such as the type available commercially as "Elastic Stopnuts." The clamp, as shown, has a lower body with a central saddle portion adapted to fit around the cross frame member or torsion bar 20b, and end portions 69 fitted to the longitudinal frame members 11b. A clamp block 70 of nylon or like material, fits into the saddle, over the members 20b and under longitudinal frame member 11b; so that when the clamp is tightened this block 70 is compressed and exerts a friction hold, and by its yieldable compression allows the end portions 69 also to engage the frame member. A nylon bushing 71 may be used in bearing clamp 24b.

FIGURE 11 illustrates hulls provided with a centerboard 32a pivotally mounted at the stern so that, if one should strike and obstruction it will swing back and up.

In FIGURE 12 three hulls are shown, two forward hulls 22c and one aft 23c with their respective dynamic centers of buoyancy 75, positioned at the apices of an equilateral triangle (outlined by broken lines). The deck is shown at 12c with depending posts 76, 76', the hulls being connected thereto through the torsion bars 20c, 20c', respectively.

The mast 48c is stepped on the deck between the forward hulls 22c and forward of hull 23c. A center board 32c is mounted as shown between hulls 22c.

Steering means is represented by a rudder 34c mounted at the rear of the deck. This location is good but is not essential; and outboard motors (when used) can be turned for steering as with other outboard motor boats heretofore known, or as described above.

Power nacelles 78 are secured to the deck, with propellers 79 on shafts extending down into the water. Propellers are preferably driven by a right angle drive, such as that used for conventional outboard motors. When sailing, these nacelles may be raised or the propellers and shafts tipped up out of the water to reduce drag. In small boats, the power units may be standard outboard motors mounted on the edge of the deck or in nacelles 78, and extending down sufficiently for the propellers to remain in the water under various wave conditions.

The present invention is concerned with hull arrangement and attachment, and as has been pointed out above is not concerned with the details of hull design. The hulls shown are diagrammatic and designed according to known principles, either for sailing vessels or for power vessels which may achieve very high speeds.

With the sea sled type hulls of FIGS. 1–4, the center of buoyancy moves relatively little with movement and increasing speed, a characteristic which is called "stiffness," whereas with the more conventional hulls of FIGURE 12, the change to dynamic buoyancy results in substantial change of trim and the DCB moves aft substantially. Although I have not shown examples of stepped hulls such as are used on hydroplane type speed boats, and I find that the types shown are better, nevertheless such stepped hulls can be used with this invention.

Other supporting means may be used, such as hydrofoils 80 (FIGURE 15), secured to, but well below, the deck to take over the support of the vessel, to cooperate with the hulls to that effect and/or to aid in effecting planing by lifting of the hulls in the water. Such hydrofoils when used on a high speed powered vessel cut hull resistance materially, e.g., at speed/length ratio around 5, resistance can be cut in half.

Sloped hydrofoils 80' may be used as shown in FIGURE 15. The tendency to heeling over either by force of the wind or by momentum on a turn, will be resisted by the dynamic lift of the hydrofoil and this will help to correct any threatened loss of planing by the hulls. In fact, the simplest way to keep powered vessels equipped with foils from rolling is to use sloped foils. For example, if a sloped port foil rises it loses lift because it becomes more vertical. The starboard foil gains lift because it becomes more horizontal.

These hydrofoils may be mounted on extensible and retractable arms for up and down adjustment and may also be slidably mounted on tracks on the underside of the deck, or other provision made for fore-and-aft and/or athwartship adjustment of their positions. The angle of attack of the foils is also advantageously adjustable. Because the action of such foils could be reversed by certain following sea conditions, or for other reasons, it may be desired to fall back fully onto the planing hulls, the vertical arms then being retracted. In regular seas, it may be advantageous to extend them to greater depth; and the horizontal adjustments permit the most advantageous lift for desired planing action of the hulls.

The use of planing type hulls with such hydrofoils is a better, safer combination because at high speed the hull can take to the water without the shock it would give if it were an ordinary displacement type, and the hydrofoil at a speed which would not give it sufficient lift may yet cooperate to give a quicker or better planing action.

Ordinary propeller drives have been shown for the power; but, of course, other propulsion means such as motor driven pumps which discharge water as a jet may be employed, and air screws, or airplane type of jet engines can be used in the air above the deck. It is an advantage of the present invention that it can be used with various types of power plants and power plant arrangements.

FIGURES 13 and 14 show the relation of the hulls as the vessel goes over a steep wave. This applies likewise with a greater number of hulls.

The use of torsion bar for mounting the hulls to give pivoting on a transverse horizontal axis starting freely but with increasing resistance to pitch is advantageous; but the invention can be used with journal mountings with or without spring or pneumatic or other yieldable or damping devices to provide resistance to pitching of the hulls. The axis of this hinge mounting is advantageously near the dynamic center of buoyancy—taking into consideration the wetted surface of the hull under actual conditions of travel through the water. Most advantageously, the hinge axis will be positioned fore-and-aft between the static center of buoyancy and the center of flotation. This causes the hull to assume the proper relation to unlevel water while the deck remains substantially level. The hulls follow the waves as illustrated in FIGURES 13 and 14, but the deck does not.

I have found it advantageous to have the deck above the water level a distance equal to about 1/7 of the distance between the centers of buoyancy of the outermost hulls. This is lower than would be safe with prior vessels of this type. In general, I have found it advantageous to have the spacing of the outermost hulls from the axis of the vessel about equal to ½ the height, above the water level, of the center of effort on the sails.

I claim:

1. A multi-hull vessel comprising in combination: a load-carrying structure and a plurality of planing type hulls thereunder, said hulls including a bottom surface designed to plane over a water surface, said surface being configured so as to present a substantially larger area rearward of the longitudinal center of the hull than forward of said center whereby the static and dynamic centers of buoyancy of said hull are aft of said center; flexible connection means between each of said hulls and said load-carrying structure, said connection means comprising fixed pivot axes extending athwartship parallel to each other, said hulls each being pivotable about a corresponding one of said axes only in planes which are parallel to each other, each of said axes extending in respective planes located between said static and said dynamic centers of buoyancy, said axes being symmetrically arranged at the apices of an isosceles polygon, said connection means holding said load-carrying structure in upwardly spaced apart relationship to said hulls whereby said hulls are free to trim to waves without obstruction from said structure.

2. A vessel as defined in claim 1 in which a plurality of the hulls on both port and starboard sides respectively, are connected to said load-carrying structure in tandem and in close bow-to-stern relation.

3. A vessel as defined in claim 1 in which the connection means comprises a torsion bar for each hull connected at one end to the load-carrying structure and at the other to the hull.

4. A vessel as defined in claim 1 in which the vessel is powered by sail on a mast located abaft the dynamic centers of buoyancy of the forward hulls and forward of the rynamic centers of buoyancy of the after hulls.

5. A vessel as defined in claim 4 which further comprises at least one leeboard to present a broad area of resistance to leeway in the water, said area of resistance being located and controlled with respect to the fore and aft axis of the vessel and to its other lateral resistance so that the center of resistance is abaft the center of effort which drives the vessel through the water.

6. A vessel as defined in claim 1 which further comprises at least one leeboard pivotally mounter near the stern of its hull to swing from extension below the hull to extension abaft the hull.

7. A vessel as defined in claim 1 in which the several hulls are relatively short and nearly equal in displacement with the forward hulls of substantially greater buoyancy and the hulls located aft of lesser buoyancy.

8. A vessel according to claim 1 wherein a plurality of hydrofoils are secured to the load supporting structure located beyond the geometric figure defined by the centers of hull buoyancy.

9. A vessel as defined in claim 1 in which the hulls are sea sled type adapted to plane on the water and are close together in tandem at each side so that the after hulls move on water smoothed and aerated by passage of the forward hulls.

10. A vessel as defined in claim 1 in which the flexible connection is resiliently urged to a position with the designed water line of the hull at an angle of about 20° to the horizontal.

11. A vessel as defined in claim 1 in which the polygon is a rectangle of greater length than breadth but less than twice as long as it is broad.

References Cited by the Examiner

UNITED STATES PATENTS

| | | | |
|---|---|---|---|
| 259,308 | 6/1882 | Havens | 114—132 |
| 942,687 | 12/1909 | White | 114—61 |
| 1,738,979 | 12/1929 | Adelmann. | |
| 2,344,619 | 3/1944 | Lake | 114—66.5 |
| 2,347,959 | 5/1944 | Moore et al. | 114—61 |
| 3,077,850 | 2/1963 | Beuby | 114—132 |

FOREIGN PATENTS 753,711   10/1933   France.

FERGUS S. MIDDLETON, *Primary Examiner.*

ANDREW H. FARRELL, MILTON BUCHLER,
*Examiners.*